(12) United States Patent
Zou et al.

(10) Patent No.: US 11,258,721 B2
(45) Date of Patent: Feb. 22, 2022

(54) RADIO LINK CONTROL (RLC) ACKNOWLEDGED MODE (AM) DATA RECEPTION

(71) Applicant: ZTE Corporation, Guangdong (CN)

(72) Inventors: Wei Zou, Guangdong (CN); Zongkun Shi, Guangdong (CN); He Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 50 days.

(21) Appl. No.: 16/923,622

(22) Filed: Jul. 8, 2020

(65) Prior Publication Data

US 2020/0344174 A1    Oct. 29, 2020

Related U.S. Application Data

(63) Continuation of application No. PCT/CN2018/071771, filed on Jan. 8, 2018.

(51) Int. Cl.
*H04L 12/801* (2013.01)
*H04L 29/06* (2006.01)
*H04W 28/06* (2009.01)

(52) U.S. Cl.
CPC .............. *H04L 47/34* (2013.01); *H04L 69/28* (2013.01); *H04W 28/06* (2013.01)

(58) Field of Classification Search
CPC ......... H04L 47/34; H04L 69/28; H04W 28/06
See application file for complete search history.

(56) References Cited

U.S. PATENT DOCUMENTS

2020/0077299 A1*  3/2020  Wu ............... H04L 1/1621

FOREIGN PATENT DOCUMENTS

| CN | 105897385 A | 8/2016 |
| CN | 106304188 A | 1/2017 |
| WO | 2017/188698 A1 | 11/2017 |

OTHER PUBLICATIONS

3GPP TS 38.322 V1.1.0 (Year: 2017).*
3GPP, "3rd Generation Partnership Project; Technical Specification Group Radio Access Network; NR; Radio Link Control (RLC) protocol specification (Release 15)," 3GPP TS 38.322 V2.0.0, Sophia Antipolis, Valbonne, France, 32 pages, Dec. 2017.
International Search Report and Written Opinion dated Sep. 30, 2018 for International Application No. PCT/CN2018/071771, filed on Jan. 8, 2018 (7 pages).
Office Action for Chinese Patent Application No. 201880085435.7, dated Sep. 29, 2021 (13 pages).

* cited by examiner

*Primary Examiner* — Mandish K Randhawa

(57) ABSTRACT

Described are methods, systems and devices for eliminating redundant retransmissions in radio link layer (RLC) acknowledged mode (AM) data transmissions and receptions. In some embodiments, when an RLC service data unit (SDU) has not been completely received, the value of a state variable may be selectively set based on whether or not a contiguous set of byte segments of the RLC SDU have been received. This prevents the retransmission of byte segments that are either currently being transmitted or have not yet been transmitted. In other embodiments, the selective setting of the state variable may be triggered by the expiration of a reassembly timer. The described implementations may improve the data transmission of RLC SDUs in high data rate scenarios, which may be ubiquitous in 5G implementations.

20 Claims, 7 Drawing Sheets

RADIO LINK CONTROL (RLC) ACKNOWLEDGED MODE (AM) DATA RECEPTION

CROSS REFERENCE TO RELATED APPLICATIONS

This patent document is a continuation of and claims benefit of priority to International Patent Application No. PCT/CN2018/071771, filed on Jan. 8, 2018. The entire content of the before-mentioned patent application is incorporated by reference as part of the disclosure of this application.

TECHNICAL FIELD

This document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document relates to methods, systems, and devices for reception of radio link control (RLC) acknowledged mode (AM) data. In some disclosed embodiments, a receiver may selectively set the value of a state variable based on whether or not a contiguous set of byte segments of a service data unit (SDU), which itself has not been completely received, have been received. This prevents the retransmission of byte segments that are either currently being transmitted or have not yet been transmitted.

In one exemplary aspect, a wireless communication method is disclosed. The method includes determining that a timer is inactive and a value of a first state variable is greater than one greater than a value of a second state variable, and in response to the determining, starting the timer, receiving a number of byte segments of a service data unit (SDU) associated with a sequence number that is one less than the value of the first state variable, in response to determining that the number of byte segments are contiguous and the number of byte segments comprises a first byte segment of the SDU, setting a value of a third state variable to a value of one less than the value of the first state variable, and in response to determining that the number of byte segments are non-contiguous or the first byte segment of the SDU is excluded from the number of byte segments, setting the value of the third state variable equal to the value of the first state variable.

In one exemplary aspect, another wireless communication method is disclosed. The method includes determining that a timer has expired, updating a value of a first state variable in response to the reassembly timer being expired, determining whether a value of a second state variable is greater than one more than the value of the first state variable, and in response to the determining, starting the timer, receiving a number of byte segments of a service data unit (SDU) associated with a sequence number that is one less than the value of the first state variable, in response to determining that the number of byte segments are contiguous and the number of byte segments comprises a first byte segment of the SDU, setting a value of a third state variable to a value of one less than the value of the second state variable, and in response to determining that the number of byte segments are non-contiguous or the first byte segment of the SDU is excluded from the number of byte segments, setting the value of the third state variable equal to the value of the second state variable.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Embodiments of the disclosed technology relate to the field of 5G communication, and in particular, to the reception of RLC AM data. In order to support high-speed data transmission in 5G, the traditional RLC concatenation function is abandoned and the maintenance of the window state variable is also adjusted.

Figure 1:
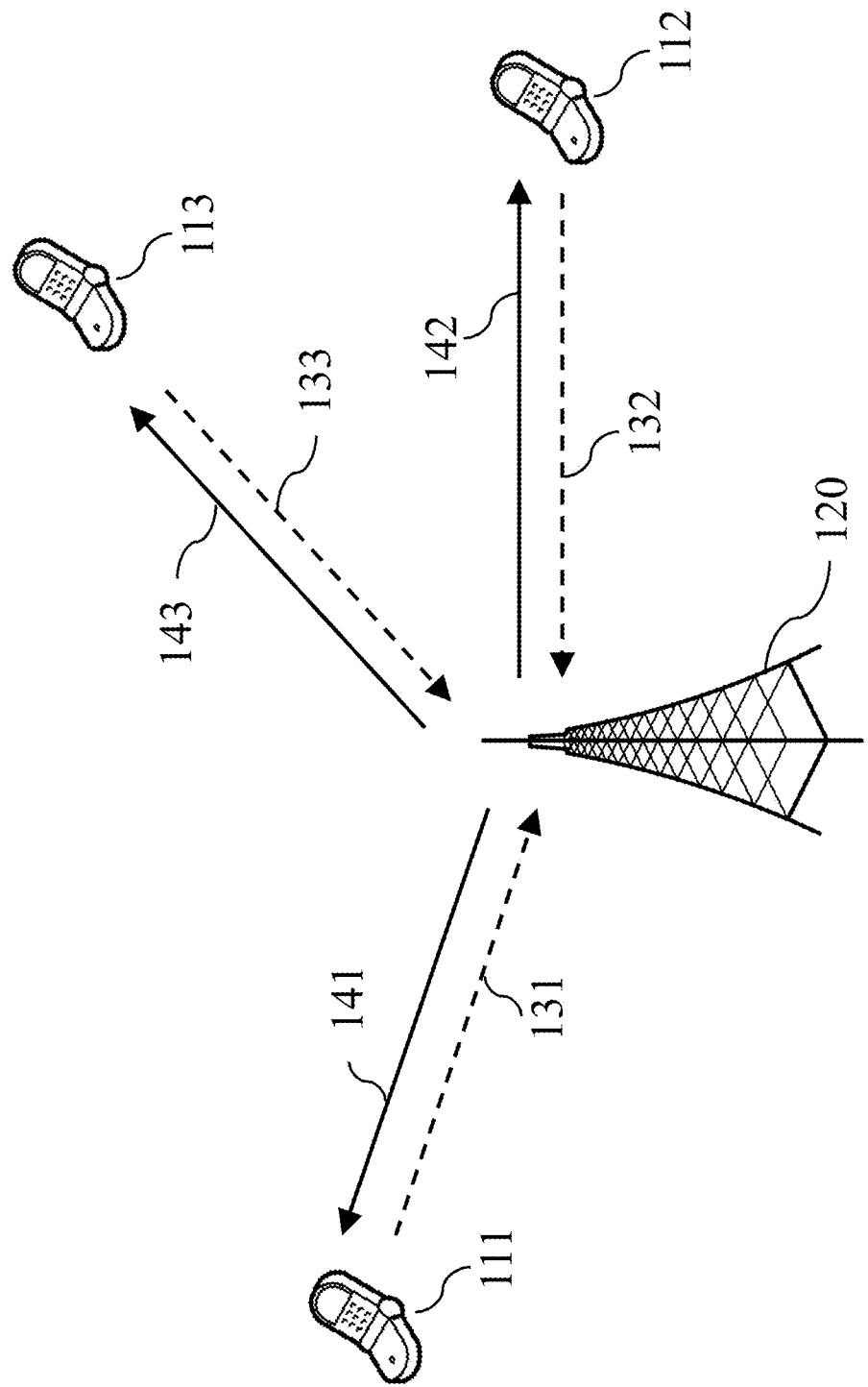
FIG. 1 shows an example of a base station (BS) and user equipment (UE) in wireless communication.

FIG. 1 shows an example of a wireless communication system that includes a base station (BS) 120 and one or more user equipment (UE) 111, 112 and 113. In some embodiments, the base station may segment a service data unit (SDU) into multiple protocol data units (PDUs), which are associated with sequence numbers and transmitted (141, 142, 143) to the UEs. Each of the UEs receives the PDUs and attempts to reassemble them into an SDU. Based on the PDUs received, the UEs may transmit (131, 132, 133) acknowledgement (ACK) or negative ACK (NACK) messages to the base station 120.

The maintenance of the data receiving window and its associated state variables in the RLC AM is described in detail in the 3GPP TS 38.322 V1.1.0 (2017-10) Technical Specification, which is hereby incorporated in its entirety by reference. In an example, the procedure for receive operations in two specific scenarios, when an Acknowledged Mode Data (AMD) PDU is placed in the reception buffer and when the reassembly timer (denoted t-Reassembly in the specification) expires, are considered in Tables 1 and 2, respectively.

TABLE 1

3GPP procedure when AMD PDU is placed in reception buffer

When an AMD PDU with SN = x is placed in the reception buffer, the receiving side of an AM RLC entity shall:
- if x >= RX_Next_Highest
    % update RX_Next_Highest to x+ 1;
- if all bytes of the RLC SDU with SN = x are received:
    % reassemble the RLC SDU from AMD PDU(s) with SN = x, remove RLC headers when doing so and deliver the reassembled RLC SDU to upper layer;
    % if x = RX_Highest_Status,
        * update RX_Highest_Status to the SN of the first RLC SDU with SN > current RX_Highest_Status for which not all bytes have been received;
    % if x = RX_Next:
        * update RX_Next to the SN of the first RLC SDU with SN > current RX_Next for which not all bytes have been received;
- if t-Reassembly is running:
    % if RX_Next_Status_Trigger = RX_Next + 1 and there is no missing byte segment of the SDU associated with SN = RX_Next before the last byte of all received segments of this SDU; or
    % if RX_Next_Status_Trigger falls outside of the receiving window and RX_Next_Status_Trigger is not equal to RX_Next + AM_Window_Size:
        * stop and reset t-Reassembly;
- if t-Reassembly is not running (includes the case t-Reassembly is stopped due to actions above):
    % if RX_Next_Highest > RX_Next + 1; or
    % if RX_Next_Highest = RX_Next + 1 and there is at least one missing byte segment of the SDU associated with SN = x before the last byte of all received segments of this SDU:
        * start t-Reassembly;
        * set RX_Next_Status_Trigger to RX_Next_Highest.

TABLE 2

3GPP procedure when the reassembly timer expires

When t-Reassembly expires, the receiving side of an AM RLC entity shall:
- update RX_Highest_Status to the SN of the first RLC SDU with SN >= RX_Next_Status_Trigger for which not all bytes have been received;
- if RX_Next_Highest> RX_Highest_Status +1; or
- if RX_Next_Highest = RX_Highest_Status + 1 and there is at least one missing byte segment of the SDU associated with SN = RX_Highest_Status before the last byte of all received segments of this SDU:
    % start t-Reassembly;
    % set RX_Next_Status_Trigger to RX_Next_Highest.

In some embodiments, and according to the reception procedure of the RLC AM PDU, the segments that may be assembled into a complete SDU are identified and the corresponding state variables updated. In other embodiments, when a complete SDU cannot be assembled, the corresponding received segments may be temporarily saved until subsequent RLC AM PDUs are received.

In some embodiments, byte segments of the SDU are generated dynamically. In an example, an SDU (with size 10 k bytes) may be initially split into two byte segments (with segment #1 being 4 k bytes and segment #2 being 6 k bytes). If, in this example, byte segment #1 is received, but byte segment #2 is not, then byte segment #2 may be split into two additional segments of size 3 k bytes each.

As described in Tables 1 and 2, in a concurrent procedure the reassembly timer (t-Reassembly) and RX_Next_Status_Trigger are updated based on RX_Next_Highest, RX_Next, and RX_Highest_Status. This may be performed to generate and transmit a status report to the sender, which will perform a retransmission process according to the status report.

However, the existing 3GPP protocols disclosed in Tables 1 and 2 result in redundant transmissions. In an example, the last RLC AM PDU transmitted on an authorized resource by a sender may be the first segment of the RLC SDU or part of a contiguous set of segments (which includes the first segment) received. This reception of the last RLC AM PDU may trigger a status report (due to, for example, the reassembly timer expiring). In the status report, and according to the procedures described in Tables 1 and 2, a NACK will be set for the RLC SDU as well as for the first segment or the part of a contiguous set of segments.

In a first scenario, this may result in the sender being request to retransmit segments that have not been transmitted before. In a second scenario, if the remaining byte segments of the RLC SDU were transmitted but not received, the NACK in the status report may request the retransmission of byte segments that are currently over-the-air. In both scenarios, the existing 3GPP procedures disclosed in Tables 1 and 2 may lead to wasted resources.

Figure 2:
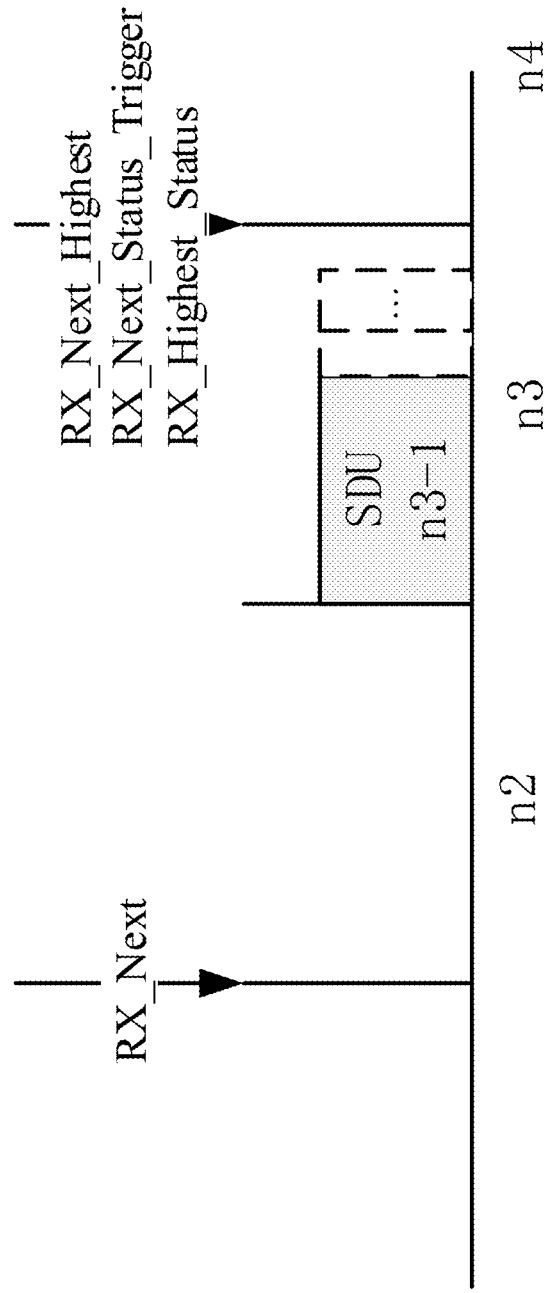
FIG. 2 shows an example of reception of RLC AM data.

FIG. 2 shows an example of reception of RLC AM data based on the procedures described in Tables 1 and 2. As shown in the example in FIG. 2, the SDU with sequence number n2 (which is abbreviated as SDU n2, or simply n2, in the remainder of this document) has not been received, and only the first segment of the SDU n3 (denoted n3-1) has been received. It is further assumed that RLC SDUs n0 and n1 have already been received.

The initial values of the state variables of interest are assumed to be RX_Next=n2, RX_Next_Highest=n2, RX_Highest_Status=n2, and the reassembly timer inactive.

After the first segment (n3-1) is received, the state variables may be updated to RX_Next=n2, RX_Next_Highest=n4, RX_Highest_Status=n2, RX_Next_Status_Trigger=n4, and the reassembly timer is started.

After the reassembly timer expires, the state variables may be updated to RX_Next=n2, RX_Next_Highest=n4, RX_Highest_Status=n4, RX_Next_Status_Trigger=n4, as shown in FIG. 2.

In this case, a status report is transmitted to the sender with the ACK-SN set to n4, the NACK-SN set to n2 and n3, n3 carries SOstart and SOend, therein indicating that SDUs n2 and n3 have not been received. In this case, the other byte segments of the SDU n3 may not be sent if there is insufficient authorization, or if they are in the process of being transmitted (over-the-air) but have not been received.

The example described in the context of FIG. 2 may not exist in the current LTE implementation since the ACK/NACK status information is transmitted for LTE RLC PDUs, whereas in a 5G implementation, the ACK/NACK status information may be transmitted for RLC SDUs instead.

Embodiments of the disclosed technology overcome existing problems of the existing procedures for RLC AM data reception as currently disclosed in the specification. The disclosed embodiments solve the prevalent redundant retransmission issues that may arise based on the status of the reassembly timer.

In an example, the value of the state variable RX_Next_Status_Trigger may be adjusted so that when the status report is transmitted, the state of the last SDU is not included. The state of the last SDU may not be currently determinable, since only a first byte segment or a contiguous set of byte segments have been received, and is not included in the status report.

In some embodiments, this may be achieved using the procedures described in Tables 3 and 4, which correspond to the scenarios wherein an Acknowledged Mode Data (AMD) PDU is placed in the reception buffer and when the reassembly timer expires, respectively.

TABLE 3

Exemplary procedure when AMD PDU is placed in reception buffer

When an AMD PDU with SN = x is placed in the reception buffer, the receiving side of an AM RLC entity shall:
- if x >= RX_Next_Highest
    % update RX_Next_Highest to x+ 1;
- if all bytes of the RLC SDU with SN = x are received:
    % reassemble the RLC SDU from AMD PDU(s) with SN = x, remove RLC headers when doing so and deliver the reassembled RLC SDU to upper layer;
    % if x = RX_Highest_Status,
        * update RX_Highest_Status to the SN of the first RLC SDU with SN > current RX_Highest_Status for which not all bytes have been received;
    % if x = RX_Next:
        * update RX_Next to the SN of the first RLC SDU with SN > current RX_Next for which not all bytes have been received;
- if t-Reassembly is running:
    % if RX_Next_Status_Trigger = RX_Next + 1 and there is no missing byte segment of the SDU associated with SN = RX_Next before the last byte of all received segments of this SDU; or
    % if RX_Next_Status_Trigger falls outside of the receiving window and RX_Next_Status_Trigger is not equal to RX_Next + AM_Window_Size:
        * stop and reset t-Reassembly;
- if t-Reassembly is not running (includes the case t-Reassembly is stopped due to actions above):
    % if RX_Next_Highest> RX_Next +1;
        * if there is no missing byte segment of the SDU associated with SN = RX_Next_Highest −1 before the last byte of all received segments of this SDU for which not all bytes have been received,
            # start t-Reassembly;
            # set RX_Next_Status_Trigger to RX_Next_Highest − 1.
        * else
            # start t-Reassembly;
            # set RX_Next_Status_Trigger to RX_Next_Highest.
    % if RX_Next_Highest = RX_Next + 1 and there is at least one missing byte segment of the SDU associated with SN = x before the last byte of all received segments of this SDU:
        * start t-Reassembly;
        * set RX_Next_Status_Trigger to RX_Next_Highest.

TABLE 4

Exemplary procedure when the reassembly timer expires

When t-Reassembly expires, the receiving side of an AM RLC entity shall:
- update RX_Highest_Status to the SN of the first RLC SDU with SN >= RX_Next_Status_Trigger for which not all bytes have been received;
- if RX_Next_Highest> RX_Highest_Status +1:
    % if there is no missing byte segment of the SDU associated with SN = RX_Next_Highest −1 before the last byte of all received segments of this SDU for which not all bytes have been received,
        * start t-Reassembly;
        * set RX_Next_Status_Trigger to RX_Next_Highest − 1.
    % else
        * start t-Reassembly;
        * set RX_Next_Status_Trigger to RX_Next_Highest.
- if RX_Next_Highest = RX_Highest_Status + 1 and there is at least one missing byte segment of the SDU associated with SN = RX_Highest_Status before the last byte of all received segments of this SDU:
    % start t-Reassembly;
    % set RX_Next_Status_Trigger to RX_Next_Highest.

The exemplary procedures disclosed in Tables 3 and 4 may solve the existing problems caused by redundant transmissions, and may improve the data transmission of RLC SDUs in high data rate scenarios, which may be ubiquitous in 5G implementations.

Figure 3:
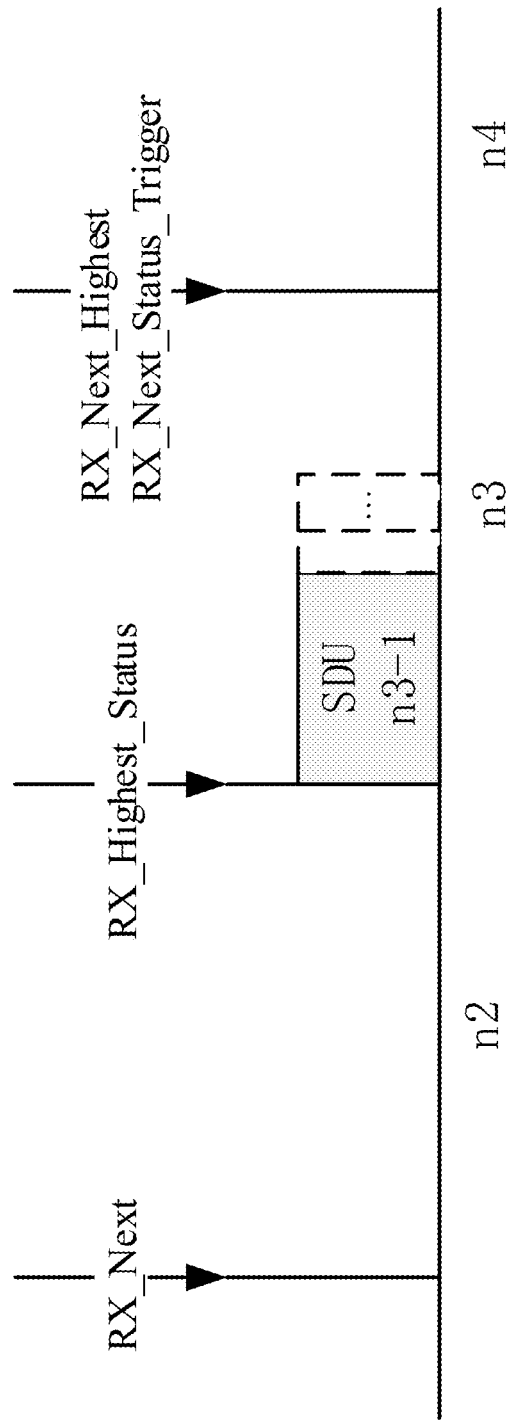
FIG. 3 shows another example of reception of RLC AM data.

FIG. 3 shows an example of reception of RLC AM data based on the procedures described in Tables 3 and 4. This example includes some features and/or conditions that are similar to those shown in FIG. 2. At least some of these features and/or conditions may not be separately described in this section.

The example in FIG. 3 has a similar framework as described in FIG. 2, wherein SDU n2 has not been received, and only the first segment of SDU n3 (denoted n3-1) has been received. It is further assumed that RLC SDUs n0 and n1 have already been received. However, the procedure described in Tables 3 and 4 are implemented in this example.

The initial values of the state variables of interest are assumed to be RX_Next=n2, RX_Next_Highest=n2, RX_Highest_Status=n2, and the reassembly timer inactive.

After the first segment (n3-1) is received, the state variables may be updated to RX_Next=n2, RX_Next_Highest=n4, RX_Highest_Status=n2, RX_Next_Status_Trigger=n3, and the reassembly timer is started.

After the reassembly timer expires, the state variables may be updated to RX_Next=n2, RX_Next_Highest=n4, RX_Highest_Status=n3, RX_Next_Status_Trigger=n4, as shown in FIG. 3.

In this example, the status report that is generated and transmitted to the sender includes the ACK-SN set to n3 and the NACK-SN set to n2. In contrast to the example disclosed in FIG. 2, NACK-SN is set to n2 (instead of n3) since the state of SDU n3 has not yet be determined because only the first segment has been received. This ensures that the redundant retransmissions are eliminated.

Figure 4:
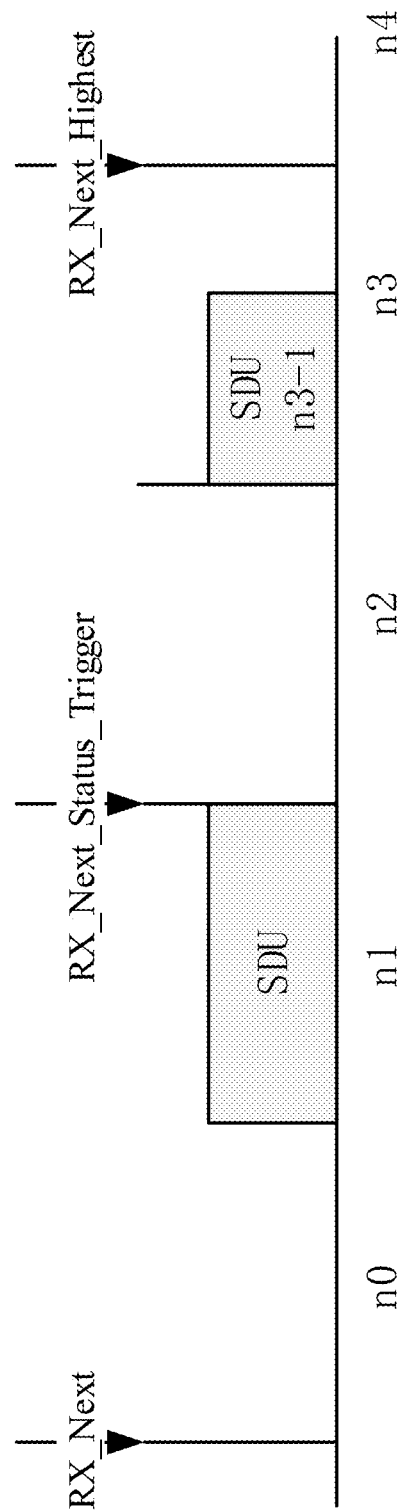
FIG. 4 shows yet another example of reception of RLC AM data.

FIG. 4 shows another example of reception of RLC AM data based on the procedures described in Tables 3 and 4. This example includes some features and/or conditions that are similar to those shown in FIGS. 2 and 3. At least some of these features and/or conditions may not be separately described in this section.

In this example, SDU n1 has been received, but both SDUs n0 and n2 have not been received. In addition, the first segment of SDU n3 (denoted n3-1) has also been received. The initial values of the state variables of interest are assumed to be RX_Next=n0, RX_Next_Highest=n0, RX_Highest_Status=n0, and the reassembly timer inactive.

After SDU n1 and the first segment (n3-1) of SDU n3 have been received, the state variables may be updated to RX_Next=n0, RX_Next_Highest=n4, RX_Highest_Status=n0, RX_Next_Status_Trigger=n2, as shown in FIG. 4, and the reassembly timer is started.

After the reassembly timer expires, the state variables may be updated to RX_Next=n0, RX_Next_Highest=n4, RX_Highest_Status=n2, RX_Next_Status_Trigger=n3.

At this stage, a status report may be transmitted due to the expiration of the reassembly timer, in which the ACK-SN is set to n2 and NACK-SN is set to n0. The reassembly timer is then restarted.

After the reassembly timer expires again, the state variables may be updated to RX_Next=n0, RX_Next_Highest=n4, RX_Highest_Status=n3, RX_Next_Status_Trigger=n4. And the status report that is now transmitted has the ACK-SN set to n3, and the NACK-SN set to {n0, n2}. Since the state of SDU n3 has not yet be determined because only the first segment has been received, it is not included in the status report.

Figure 5:
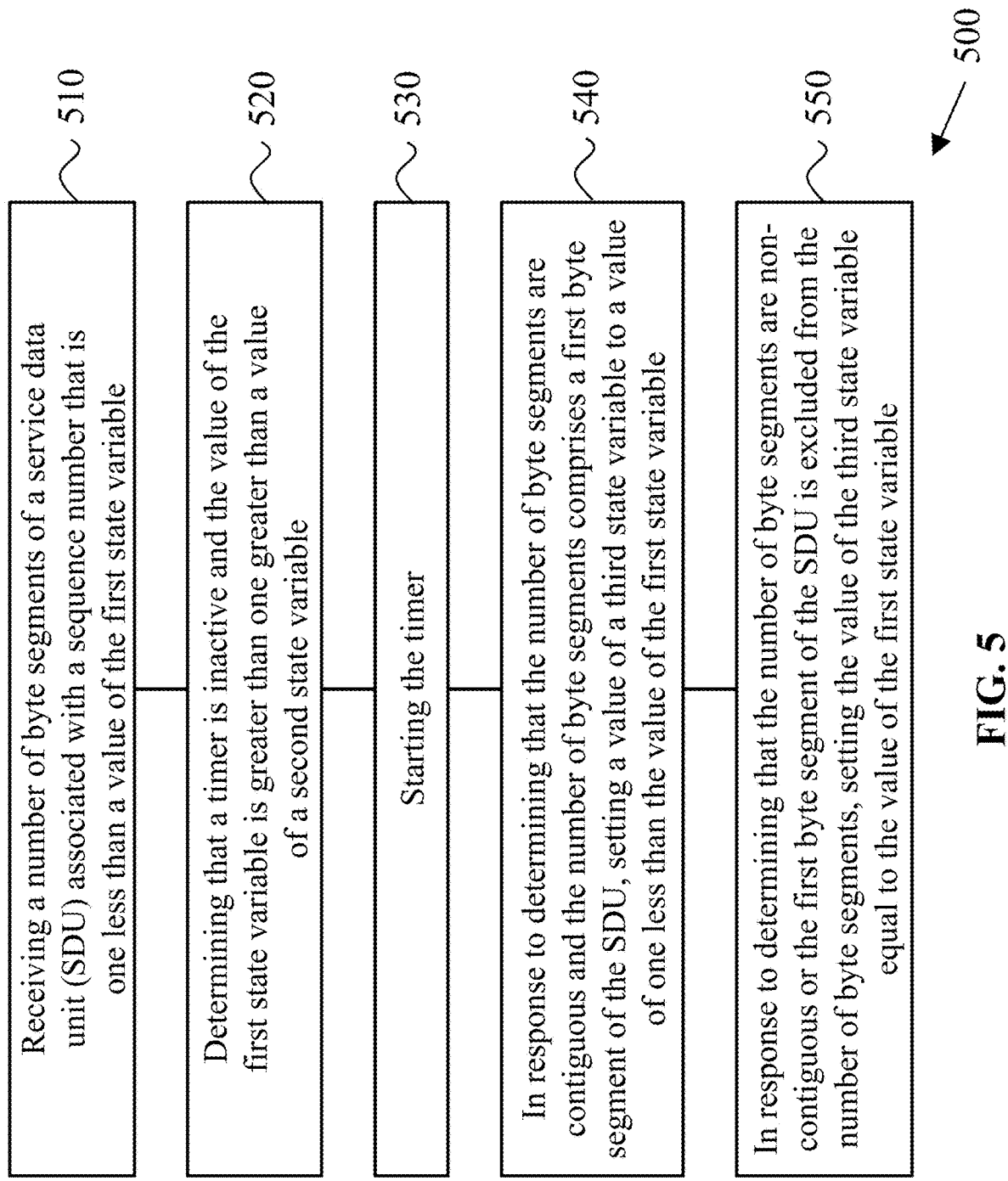
FIG. 5 shows an example of a wireless communication method for reception of RLC AM data.

FIG. 5 shows an example of a wireless communication method for reception of RLC AM data. In some embodiments, the method 500 may be implemented when an AMD PDU is placed in a reception buffer. In an example, the state variables may be updated, PDUs reassembled, and the RLC SDU delivered to the upper layers. In other embodiments, the reassembly timer may be started and stopped as required.

The method 500 includes, at step 510, receiving a number of byte segments of a service data unit (SDU) associated with a sequence number (SN) that is one less than a value of a first state variable. In some embodiments, the number of byte segments received is less than the total number of byte segments of the SDU. In other embodiments, the SN of the SDU, for which not all byte segments have been received, may equal (RX_Next_Highest−1).

The method 500 includes, at step 520, determining that a timer is inactive and the value of the first state variable is greater than one greater than a value of a second state variable. In some embodiments, the reassembly timer (referred to as t-Reassembly) is used by the receiving side of an AM RLC entity in order to detect loss of RLC PDUs at lower layer. In other embodiments, if the timer is running, another timer shall not be started additionally, e.g., only one reassembly timer may running at a given time per RLC entity.

In some embodiments, the timer may correspond to a reassembly timer, the first state variable may correspond to RX_Next_Highest, and the second state variable may correspond to RX_Next. In an example, RX_Next_Highest may hold the value of the sequence number (SN) following the SN of the RLC SDU with the highest SN among received RLC SDUs, and may be initially set to 0. In another example, RX_Next may hold the value of the SN following the last in-sequence completely received RLC SDU, and may serve as the lower edge of a receiving window. RX_Next may initially be set to 0, and may be updated whenever the AM RLC entity receives an RLC SDU with SN=RX_Next.

In some embodiments, the determining the status of the timer may be performed concurrently with the receiving the bytes segments of the SDU. In other embodiments, the status of the timer may be determined before the byte segments are received. In yet other embodiments, the byte segments may be received before the status of the timer is determined.

The method 500 includes, at step 530, starting the timer.

The method 500 includes, at step 540, in response to determining that the number of byte segments are contiguous and the number of byte segments comprises a first byte segment of the SDU, setting a value of a third state variable to a value of one less than the value of the first state variable. In some embodiments, the third state variable may be RX_Next_Status_Trigger, which is a state variable of the reassembly timer. This state variable may hold the value of the SN following the SN of the RLC SDU which triggered the reassembly timer.

In some embodiments, and as described in the context of the examples shown in FIGS. 3 and 4, setting the value of RX_Next_Status_Trigger to one less than the value of RX_Next_Highest may result in a generated status report not including a status for the SDU that is currently being received. This results in byte segments of that SDU not being retransmitted. In an example, this may be advantageous because the missing byte segments are either currently being transmitted (over-the-air) or have not been transmitted for the first time, and retransmitting those byte segments would waste system resources.

The method 500 includes, at step 550, in response to determining that the number of byte segments are non-contiguous or the first byte segment of the SDU is excluded from the number of byte segments, setting the value of the third state variable equal to the value of the first state variable. In some embodiments, if there are missing byte segments from the contiguous set of byte segments, then a request for retransmission is appropriate, and setting the value of RX_Next_Status_Trigger to the value of RX_Next_Highest results in the NACK-SN including the SN of the SDU currently being received.

Figure 6:
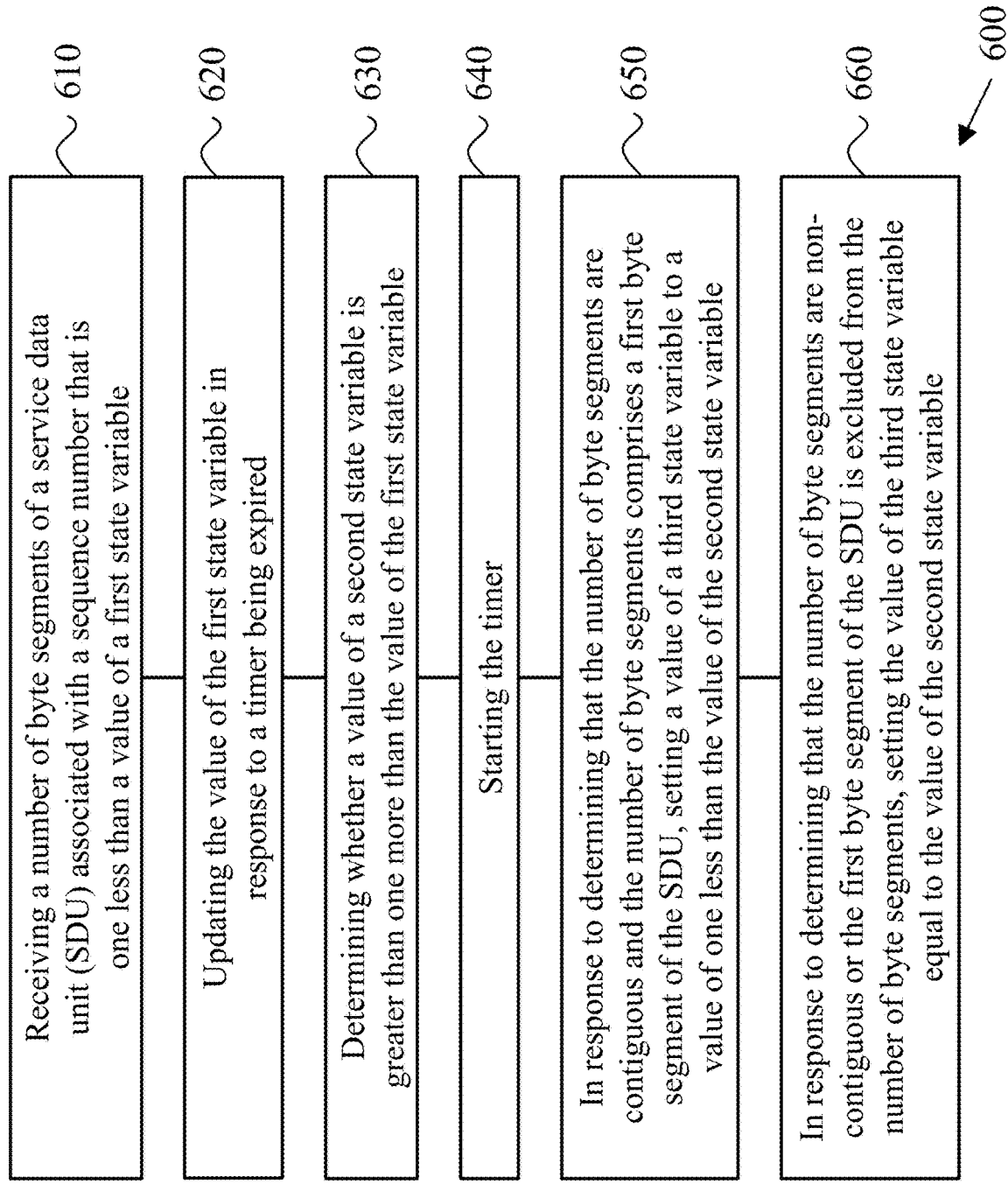
FIG. 6 shows another example of a wireless communication method for reception of RLC AM data.

FIG. 6 shows another example of a wireless communication method for reception of RLC AM data. This example includes some features and/or steps that are similar to those shown in FIG. 5, and described in this document. At least some of these features and/or steps may not be separately described in this section. In some embodiments, the method 600 may be implemented when the reassembly timer expires. In an example, the state variables may be updated and the reassembly timer restarted as required.

The method 600 includes, at step 610, receiving a number of byte segments of a service data unit (SDU) associated with a sequence number that is one less than a value of a first state variable. In some embodiments, the number of byte segments is less than the total number of byte segments of the SDU. In an example, the SDU may comprise 10 byte segments (numbered 0 through 9), but the number of byte segments received are numbered 0 through 6. Herein, the first byte segment of the SDU is received, but not all byte segments are received.

The method 600 includes, at step 620, updating a value of a first state variable in response to the timer being expired. In some embodiments, step 620 may be preceded by determining that the timer has expired. In other embodiments, the timer may correspond to the reassembly timer, and the first state variable may correspond to RX_Highest_Status. If the reassembly timer has expired, the value of RX_Highest_Status may be updated to the SN of the first RLC SDU with SN≥RX_Next_Status_Trigger for which not all byte segments have been received.

In some embodiments, the determining the status of the timer may be performed concurrently with the receiving the bytes segments of the SDU. In other embodiments, the status of the timer may be determined before the byte segments are received. In yet other embodiments, the byte segments may be received before the status of the timer is determined.

The method 600 includes, at step 630, determining whether a value of a second state variable is greater than one more than the value of the first state variable. In some embodiments, the second state variable may correspond to RX_Next_Highest.

The method 600 includes, at step 640, starting the timer.

The method 600 includes, at step 650, in response to determining that the number of byte segments are contiguous and the number of byte segments comprises a first byte segment of the SDU, setting a value of a third state variable to a value of one less than the value of the second state variable. In some embodiments, the third state variable may correspond to RX_Next_Status_Trigger.

The method 600 includes, at step 660, in response to determining that the number of byte segments are non-contiguous or the first byte segment of the SDU is excluded from the number of byte segments, setting the value of the third state variable equal to the value of the second state variable.

Figure 7:
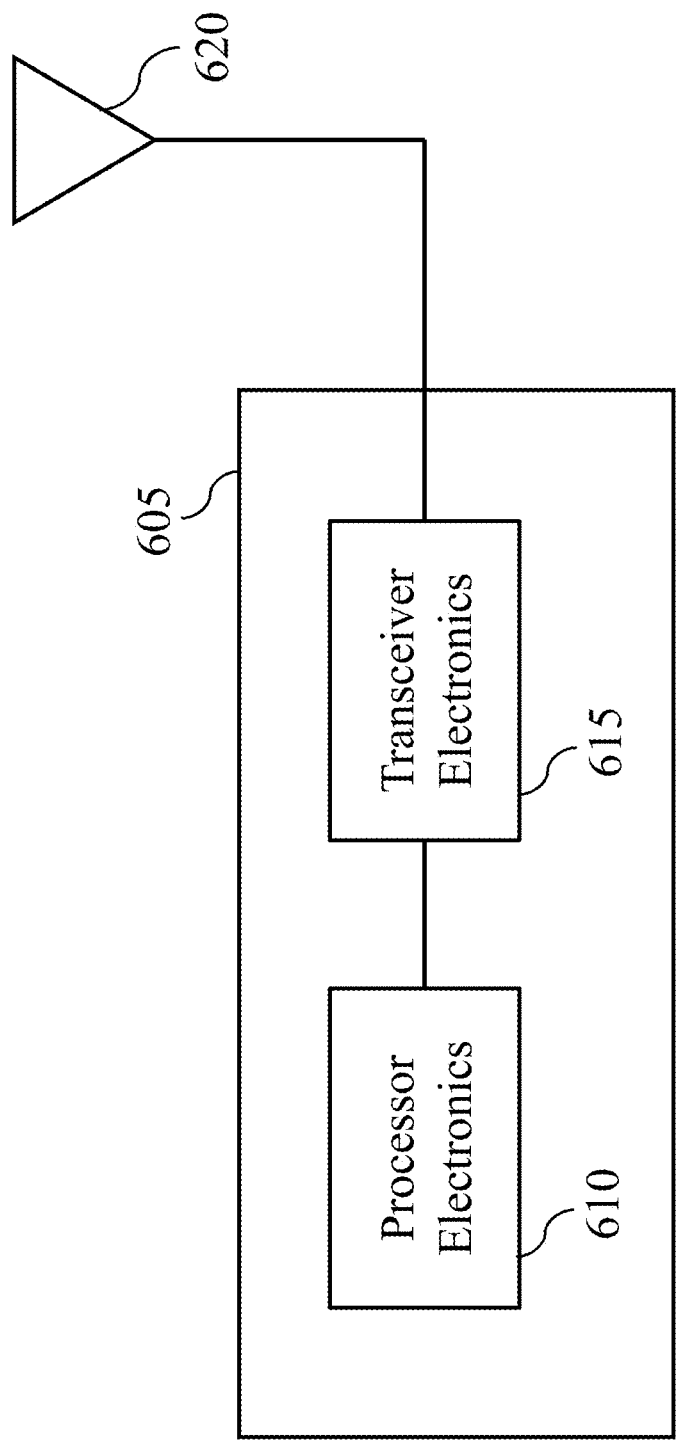
FIG. 7 is a block diagram representation of a portion of a radio station, in accordance with some embodiments of the presently disclosed technology.

FIG. 7 is a block diagram representation of a portion of a radio station, in accordance with some embodiments of the presently disclosed technology. A radio station 705, such as a base station or a wireless device (or UE), can include processor electronics 710 such as a microprocessor that implements one or more of the techniques presented in this document. The radio station 705 can include transceiver electronics 715 to send and/or receive wireless signals over one or more communication interfaces such as antenna(s) 720. The radio station 705 can include other communication interfaces for transmitting and receiving data. Radio station 705 can include one or more memories (not explicitly shown) configured to store information such as data and/or instructions. In some implementations, the processor electronics 710 can include at least a portion of the transceiver electronics 715. In some embodiments, at least some of the disclosed techniques, modules or functions are implemented using the radio station 705.

It is intended that the specification, together with the drawings, be considered exemplary only, where exemplary means an example and, unless otherwise stated, does not imply an ideal or a preferred embodiment. As used herein, the singular forms "a", "an" and "the" are intended to include the plural forms as well, unless the context clearly indicates otherwise. Additionally, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc., that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
receiving a number of byte segments of a service data unit (SDU) associated with a sequence number that is one less than the value of a first state variable, wherein the number of byte segments is less than a total number of byte segments of the SDU;
determining that a timer is inactive and a value of the first state variable is greater than one greater than a value of a second state variable, and in response to the determining,
starting the timer;
in response to determining that the number of byte segments are contiguous and the number of byte segments comprises a first byte segment of the SDU, setting a value of a third state variable to a value of one less than the value of the first state variable; and
in response to determining that the number of byte segments are non-contiguous or the first byte segment of the SDU is excluded from the number of byte segments, setting the value of the third state variable equal to the value of the first state variable.

2. The method of claim 1, wherein the timer corresponds to a reassembly timer, wherein the first state variable corresponds to RX_Next_Highest, wherein the second state variable corresponds to RX_Next, and wherein the third state variable corresponds to RX_Next_Status_Trigger.

3. The method of any of claim 1, wherein a status report is generated based on a state of the timer and the value of the third state variable.

4. A method for wireless communication, comprising:
receiving a number of byte segments of a service data unit (SDU) associated with a sequence number that is one less than the value of a first state variable, wherein the number of byte segments is less than a total number of byte segments of the SDU;
determining that a timer has expired;
updating the value of the first state variable in response to the timer being expired;
determining whether a value of a second state variable is greater than one more than the value of the first state variable, and in response to the determining,
starting the timer;
in response to determining that the number of byte segments are contiguous and the number of byte segments comprises a first byte segment of the SDU, setting a value of a third state variable to a value of one less than the value of the second state variable; and
in response to determining that the number of byte segments are non-contiguous or the first byte segment of the SDU is excluded from the number of byte segments, setting the value of the third state variable equal to the value of the second state variable.

5. The method of claim 4, wherein the value of the first state variable is updated to a sequence number of a first SDU with a sequence number that is greater than or equal to the value of the third state variable, wherein all byte segments of the first SDU have not been received.

6. The method of any of claim 4, wherein the timer corresponds to a reassembly timer, wherein the first state variable corresponds to RX_Highest_Status, wherein the second state variable corresponds to RX_Next_Highest, and wherein the third state variable corresponds to RX_Next_Status_Trigger.

7. The method of any of claim 4, wherein a status report is generated based on a state of the timer and the value of the third state variable.

8. The method of claim 3, wherein the status report excludes a status of the SDU associated with the sequence number that is one less than the value of the first state variable.

9. The method of claim 1, wherein determining a status of the timer is performed concurrently with receiving the number of byte segments of the SDU.

10. The method of claim 1, wherein determining a status of the timer is performed before receiving the number of byte segments of the SDU.

11. The method of claim 1, wherein receiving the number of byte segments of the SDU is performed before a status of the timer is determined.

12. The method of claim 4, wherein determining a status of the timer is performed concurrently with receiving the number of byte segments of the SDU.

13. The method of claim 4, wherein determining a status of the timer is performed before receiving the number of byte segments of the SDU.

14. The method of claim 4, wherein receiving the number of byte segments of the SDU is performed before a status of the timer is determined.

15. A wireless communication device, comprising:
a receiver configured to receive a number of byte segments of a service data unit (SDU) associated with a sequence number that is one less than the value of a first state variable, wherein the number of byte segments is less than a total number of byte segments of the SDU; and
a processor, coupled to the receiver, configured to:
determine that a timer is inactive and a value of the first state variable is greater than one greater than a value of a second state variable, and in response to the determining,
start the timer;
in response to determining that the number of byte segments are contiguous and the number of byte segments comprises a first byte segment of the SDU, set a value of a third state variable to a value of one less than the value of the first state variable; and
in response to determining that the number of byte segments are non-contiguous or the first byte segment of the SDU is excluded from the number of byte segments, set the value of the third state variable equal to the value of the first state variable.

16. The wireless communication device of claim 15, wherein the timer corresponds to a reassembly timer, wherein the first state variable corresponds to RX_Next_Highest, wherein the second state variable corresponds to RX_Next, and wherein the third state variable corresponds to RX_Next_Status_Trigger.

17. The wireless communication device of claim 15, wherein a status report is generated based on a state of the timer and the value of the third state variable.

18. The wireless communication device of claim 15, wherein determining a status of the timer is performed concurrently with receiving the number of byte segments of the SDU.

19. The wireless communication device of claim 15, wherein determining a status of the timer is performed before receiving the number of byte segments of the SDU.

20. The wireless communication device of claim 15, wherein receiving the number of byte segments of the SDU is performed before a status of the timer is determined.

* * * * *

UNITED STATES PATENT AND TRADEMARK OFFICE
CERTIFICATE OF CORRECTION

| | | |
|---|---|---|
| PATENT NO. | : 11,258,721 B2 | |
| APPLICATION NO. | : 16/923622 | |
| DATED | : February 22, 2022 | |
| INVENTOR(S) | : Wei Zou et al. | |

It is certified that error appears in the above-identified patent and that said Letters Patent is hereby corrected as shown below:

On the Title Page

In Item (57), under "ABSTRACT", in Column 2, Line 2, delete "layer" and insert -- control --, therefor.

In the Specification

In Column 8, Line 42, delete "be" and insert -- been --, therefor.

In Column 9, Line 2, delete "may" and insert -- may be --, therefor.

In Column 9, Line 16, delete "the determining" and insert -- determining --, therefor.

In Column 10, Line 18, delete "the determining" and insert -- determining --, therefor.

In Column 11, Line 14, delete "(DVD)," and insert -- (DVDs), --, therefor.

In the Claims

In Column 12, Line 35, in Claim 3, delete "of any of" and insert -- of --, therefor.

In Column 13, Line 1, in Claim 6, delete "of any of" and insert -- of --, therefor.

In Column 13, Line 7, in Claim 7, delete "of any of" and insert -- of --, therefor.

Signed and Sealed this
Seventh Day of June, 2022

Katherine Kelly Vidal
*Director of the United States Patent and Trademark Office*